Sept. 19, 1950  J. A. H. BARKEIJ  2,522,921
COMBUSTION CHAMBER FOR INTERNAL-COMBUSTION ENGINES
Filed Dec. 31, 1946  6 Sheets-Sheet 1

FIG 1

INVENTOR.
J. A. H. Barkeij
ATTORNEY.

Sept. 19, 1950        J. A. H. BARKEIJ        2,522,921

COMBUSTION CHAMBER FOR INTERNAL-COMBUSTION ENGINES

Filed Dec. 31, 1946        6 Sheets-Sheet 2

INVENTOR.

J. A. H. Barkeij fig. 13a.

fig. 13b

Sept. 19, 1950   J. A. H. BARKEIJ   2,522,921
COMBUSTION CHAMBER FOR INTERNAL-COMBUSTION ENGINES
Filed Dec. 31, 1946   6 Sheets-Sheet 6 fig. 17 fig. 18 fig. 19

INVENTOR.
J. A. H. Barkeij
BY

Patented Sept. 19, 1950

2,522,921

UNITED STATES PATENT OFFICE 2,522,921

COMBUSTION CHAMBER FOR INTERNAL-COMBUSTION ENGINES

Jean A. H. Barkeij, Altadena, Calif.

Application December 31, 1946, Serial No. 724,774

19 Claims. (Cl. 123—191)

The present application is similar to my abandoned application, Ser. No. 21,403 of May 14, 1935, applying thereon the principles of my application No. 721,721 of April 20, 1934, and divisional application No. 193,550, of March 2, 1938, respectively Patents No. 2,145,577, January 31, 1939, and No. 2,191,746 of February 27, 1940, which were copending and made pending during the pendency of said application No. 21,403. Said latter application is cross-referenced in said Patent No. 2,145,577 of January 31, 1939, page 1, column 1, lines 34 to 39.

In particular I apply the following principles thereof on the arrangement of the two sparkplugs shown in the present application.

In said patents I have shown for a valve-in-head engine, combustion chambers in which two sparkplugs are shown, one of which is at least closer to the edge of the exhaust valve than to the edge of the inlet valve, and in which I may fire said sparkplugs either simultaneously or non-simultaneously.

Figure 1:
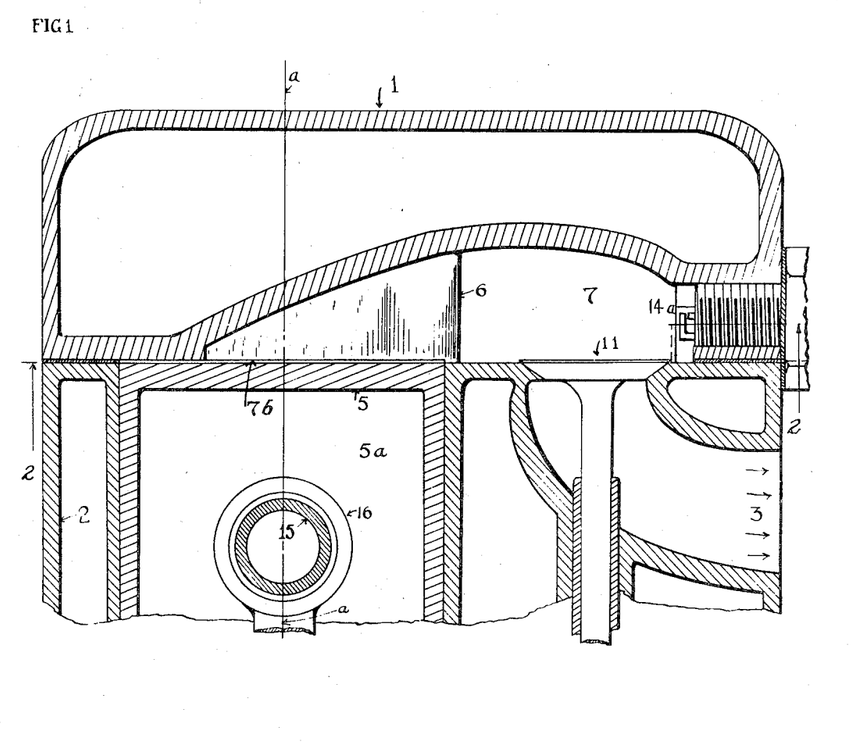
Fig. 1 is a sectional elevation view of Fig. 2 on the section line 1—1.
Figure 2:
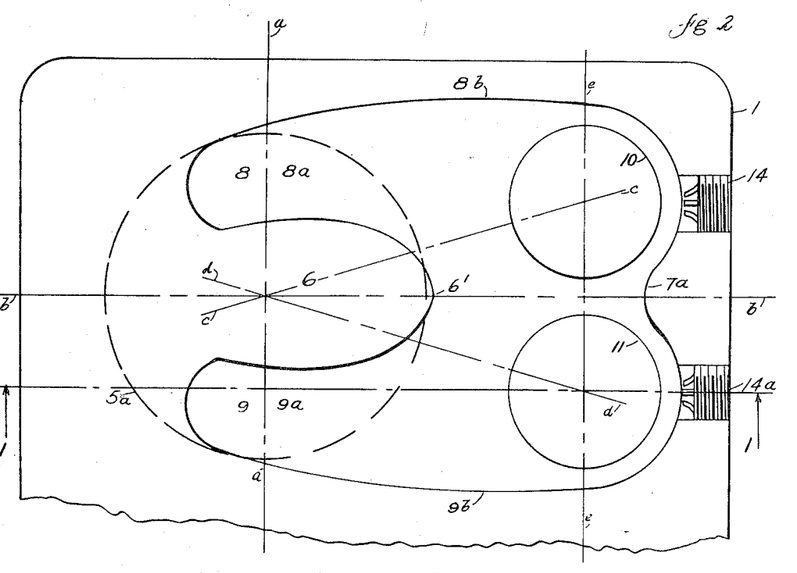
Fig. 2 is sectional plan view of the lower part of the cylinderhead of Fig. 1 and taken on the section line 2—2, of Fig. 1, showing the cylinderhead above the cylinder.

In the present application I show two sparkplugs in the Figs. 1 and 2 of which only one sparkplug is closer to the edge of the exhaust valve than to the edge of the inlet valve.

In the arrangement of Figs. 1 and 2 I prefer to fire the sparkplugs non-simultaneously, that is with an interval from 2 to 10° crankshaft rotation.

The means to effect said interval in firing I have shown in my application No. 688,167 of September 5, 1933, copending with said applications No. 21,403, No. 721,721, and 193,550, now Patent No. 2,173,081 of September 12, 1939, especially Figs. 1 and 2 thereof, and said means can be equally applied on the present arrangements in which two sparkplugs are shown.

I apply on the inlet valve an arrangement, as disclosed in my Patent No. 2,191,745 aforementioned, whereby a swirl is created in the combustion chamber either in clockwise direction or counterclockwise direction, and the sparkplug which carries the flame propagation on account of said swirl first towards the exhaust valve, or the exhaust-valve region, must fire first but may be located farther away from or as far away from the edge of the exhaust valve than from the edge of the inlet valve. (See description of plug A in Fig. 3 later on.) Although in said Patent No. 2,191,745 of February 27, 1940, no two sparkplugs are shown in the same combustion chamber, the spray from the injector 26 is carried by the swirl of the air towards the sparkplug 13a and the flame initiated by the latter sparkplug is carried first in the direction of the valve 4, which is here an exhaust and inlet valve at the same time, and has a temperature considerably higher than an ordinary inlet valve in a 4 stroke-cycle engine. The symptoms discovered here lead directly to the arrangement in the present application, in which the flame front is carried towards the exhaust valve.

This invention in Figs. 1 and 2 is shown for an L-head engine, having an inlet and exhaust valve beside the cylinderbore in upright position, and a restricted passage between the combustion chamber and the piston chamber in order to create a turbulence in the mixture just before ignition thereof.

One of my objects is to place at least one sparkplug or a single sparkplug closer to the exhaust than to the inlet valve in any L-head engine, or partially in the head and partially in the cylinder.

My second object is to place said single sparkplug between the cylinder bore and the exhaust valve and adjacent the cylinder barrel, and not remote from the barrel as disclosed and claimed in the Patent No. 1,722,404, to W. A. Whatmough.

Figure 2A:
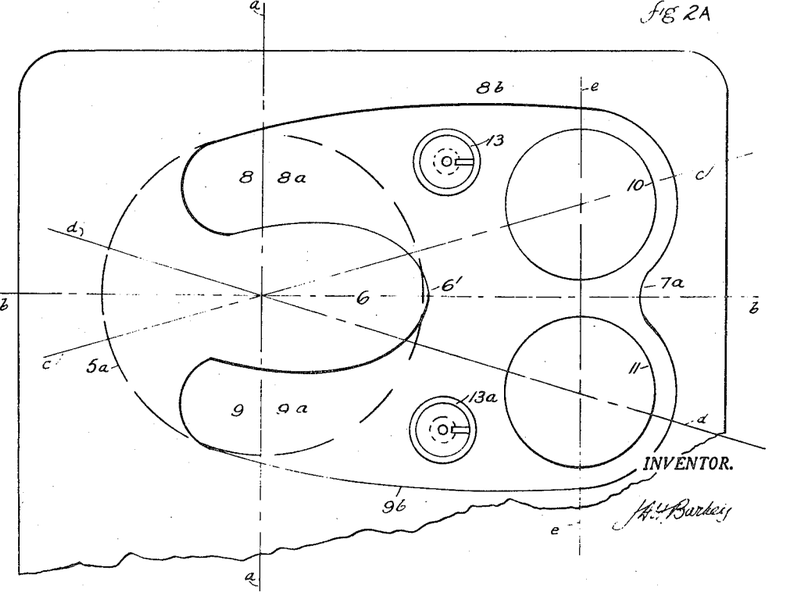
Fig. 2A shows the sparkplug 13a closer to the exhaust valve 11, and the sparkplug 13 closer to the inlet valve 10. These sparkplugs as in Fig. 2 are fired non-simultaneously, as stated in my application No. 721,721, of April 30, 1934, page 1, column 1, lines 34 to 29, inclusive.

My third object is to place one sparkplug closer to the edge or center of the exhaust valve than to the edge or center of the inlet valve, and the other sparkplug closer to the edge or center of the inlet valve than to the edge or center of the exhaust valve, as shown in Figs. 1 and 2, and 2A.

My fourth object is to fire the latter two sparkplugs substantially simultaneously, that means with a slight interval as shown and explained in my application No. 688,167, of September 5, 1933, now Patent No. 2,173,081, of September 12, 1939, Figs. 1 and 2.

In the accompanying drawings,

Fig. 2 shows one sparkplug 14a closer to the exhaust valve 11 and sparkplug 14 closer to the inlet valve 10. These plugs are fired substantially simultaneously, that means with a small interval in between.

Fig. 8 shows a vertical elevation of a cylinder and cylinderhead of a two stroke cycle engine in which the exhaust port and inlet port in the cylinder are both controlled by the piston near its bottom position.

One sparkplug A is placed near the hottest part of the piston when in top dead center and the other sparkplug B is placed near the coolest part of the piston perpendicularly above the inlet port in the cylinder.

Fig. 9 shows in vertical elevation a similar 2-stroke cycle engine, in which is shown an additional exhaust port controlled by a valve above the exhaust port in the cylinder. This latter port is opened either before or after the opening of the exhaust port in the cylinder by the piston. Diagram 10 shows the first arrangement, diagram 11 the other arrangement. One sparkplug A is placed near the edge of the exhaust valve, the other near the coolest part of the piston opposite a baffle on the piston when in top position, which baffle serves to throw the new charge up into the cylinder towards the cylinderhead.

Fig. 12 shows in elevation a 2 stroke cycle engine with exhaust valve or valves in the head and inlet ports in the cylinder controlled by the piston. One sparkplug A is placed near the edge of the exhaust valve and one near the coolest part of the piston.

Fig. 12A shows the timing of the intake and exhaust periods of the engine of Fig. 12.

Fig. 13 shows in elevation an engine with an inlet and exhaust valve in the cylinderhead. I provide on the valves a baffle H on their adjacent sides respectively or I provide the cylinderhead lengthwise with a baffle G hanging down from the roof of the cylinder as shown in Figs. 13 and 14. I place one plug near the exhaust valve and one plug B near the inlet valve.

Fig. 13b shows a plan view partly in section on the line 13b—13b of Fig. 13a.

Fig. 14 shows the inside of the cylinderhead as seen from the section line 14—14 in Fig. 13.

Fig. 15 shows the timing of the inlet and exhaust valve of Fig. 13 if this engine is used with the 2-stroke cycle. Fig. 16 shows the timing, if the valves are used for a 4-stroke cycle operation.

Fig. 1 shows the cylinderhead 1, the cylinder 2 the exhaust opening 3 controlled by the exhaust valve 11, the inlet valve 10 shown in Fig. 2, plug 14a, and the piston 5, the piston chamber 5a, the piston pin 15, the connecting rod 16, and the central projection or baffle 6 of the cylinderhead 1.

Fig. 2 shows the same parts in horizontal section. The valve chamber 7 in Fig. 1 containing the valves, is located in the head, and forms with the cylinderbore a restricted passage between the explosion chamber proper and the cylinderbore. In the present Fig. 1 the central projection 6 extends clear across the entire cylinderbore, thus dividing the restricted passage into two branches. These two passages extend on either side of the projection 6, and are respectively number 8—8a and 9—9a. The longitudinal axis of the engine, shown as the dot and dash line a—a, serving to divide said passages into portions 8, 8a and 9, 9a.

The projection 6 may be shortened if desired, providing thereby a convex wall of distinct convex shape. Said chamber has a convex shape opposite said first convex shape shown at 7a in Fig. 2. This convex shape 7a has an important function. This portion around the inlet valve directs the major part of each new charge towards the passage 8—8a instead of towards the passage 9—9a, causing thereby a swirl in the gas-mass, which continues during the compression period. Therefore I prefer to place in the Fig. 2A the single sparkplug 13a closer to the exhaust valve on account of the swirl going from the exhaust valve to the inlet valve. This swirl is directed from the inlet valve 10 into the cylinder and from there towards the exhaust valve. In the form shown in Figs. 2 and 2A, the passage 9 and 9a may be decreased appreciably, and the passage 8 and 8a increased appreciably.

This projection 6 may be slightly recessed, as shown in Fig. 1 at 7b, so that the piston surface in top dead center position is at a distance from the head substantially more than a mechanical minimum. If the projection 6 extends clear across the cylinderbore, it may rest with its outer tip 6¹ on the other side of the cylinder. Care should be taken, of course, that this tip is not too high so as to prevent the head and cylinder from pinching the gasket there between. This outer tip may be omitted in case it is desired that the projection 6 and cylinder, do not touch each other.

When the inlet valve is open during the inlet period, the mixture from this valve strikes this projection 6 and causes a swirl of the mixture in the cylinder, and the direction and intensity of this swirl depends upon the extent of the projection 6, varying in accordance with its length and shape. This swirl affects the acceleration of the flame after it has been initiated either at one particular point or at two particular points.

In the modification of Figs. 1 and 2 the flame is initiated from the electrodes of the sparkplug 14a and burns therefore the mixture over the exhaust valve 11 first and the flame progresses apparently first towards the passage 9—9a and curves around the nose 6 later. If it is initiated from sparkplug 13a it will do the same thing. The position of sparkplug 13 is shown in Fig. 2A.

In Fig. 2 the sparkplugs 14a and 14 are far apart, and the pressure rise or rather rate of pressure rise, if fired simultaneously is rather great and causes a decisive roughness in the running of the engine at certain speeds. This roughness can be cured entirely by firing the plug 14a substantially ahead of the other plug, as already explained fully in my application No. 688,167 of September 5, 1933, and my application 721,721 of April 20, 1934.

The advantage of that first or initial firing of plug 14a is further explained by the fact that the mixture in and over the hot exhaust valve is burned first so that the second plug 14 firing later has no chance to crowd an unburned portion of the charge over the exhaust valve, where its pressure and temperature may be raised to the point that detonation or self-ignition may occur.

In Fig. 2A the sparkplug 13a is fired also initially, and the sparkplug 13 later. Here the sparkplugs are in upright, vertical position instead of in a horizontal position as in Fig. 2.

In Figs. 1 and 2, the restricted passage or throat between the combustion chamber in the head and the piston chamber 5a merges into or ends into the main combustion chamber 7. The mechanical turbulence created by the two passages is greater than when they merge into a single passage as explained before by shortening the projection 6. This greater mechanical turbulence should be clearly discerned from the turbulence created by the swirl of the charge when introduced into the combustion chamber by the means disclosed in my Patent No. 2,191,745 of February 27, 1940, whereby a swirl is created by a deflecting wall arranged around a part of the periphery of the head of the valve. This swirl will continue in any valve-in-head engine having a hemispherical chamber as shown in my application 721,721 of April 20, 1934, and in said Patent No. 2,191,745, because no projection 7 like here, is ever used in a valve-in-head engine.

When the piston in Figs. 1 and 2 reaches about top position at the end of the compression period, the mixture between the head and the piston is squeezed from under the cylinderhead into the combustion chamber. The distance between the top of the piston and the undersurface of the head should be between one sixteenth to 3 sixteenths of an inch. The mixture is violently ejected from the piston-chamber 5a and converges via 7a, the opposite convex wall.

When we initiate the flame near the inlet valve from sparkplug 14 or 13 the unburned portion of the charge is compressed towards the hotter regions of the combustion chamber where the exhaust valve is located.

When we initiate on the contrary the flame near the exhaust valve from sparkplug 14a or 13a the mixture begins first to burn up that part subjected to the heat radiation of the exhaust valve 11, and compresses the unburned portion towards the cooler regions of the chamber where the inlet valve 10 is located.

When we fire two sparkplugs 14 and 14a in Fig. 2 simultaneously this effect however will not be created.

We will experience too great a rate of pressure rise, because the mixture starts to burn at two ends and the progress of the flame will be double as fast, resulting in rough running. This is particularly limited to this modification and does not necessarily extend to others.

Therefore we fire the sparkplugs 14a or 13a respectively in Figs. 1 and 2 first, and respectively the second plug 14 or 13 later with a certain number of degrees of crankshaft rotation-interval. This length of interval depends upon various factors, like the shape of the chamber, the swirl of the mixture in the chamber, and the location of the sparkplug in an additional or auxiliary chamber or not. The latter factor has been shown in my applications No. 721,721, and 193,550 (respectively Patents No. 2,145,577 and 2,191,746) and we may incorporate these auxiliary chambers here in combination with the effect of the swirl. This specific factor is retained in this application, and we show in Fig. 1 a sparkplug 14a in a shallow chamber, as a sample to indicate that any sparkplug in this application may be placed in such a chamber.

If there is enough swirl or turbulence we can apply a firing interval for the sparkplugs 14 and 14a of Fig. 2, and 13a and 13 of Fig. 2A, without too great a rate of pressure rise, because the swirl has a tendency to carry the flame faster from one point of the chamber to the other. If the other sparkplug fires later the piston has descended already on the downstroke, or is near top dead center so that the additional increase of pressure from the second plug cannot develop sufficiently before the piston is going down.

Figure 3:
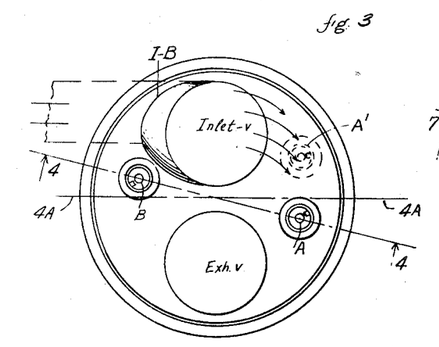
Fig. 3 shows the inside of the cylinderhead on the section line 3—3 of Fig. 4, of a four stroke cycle engine.
Figure 4:
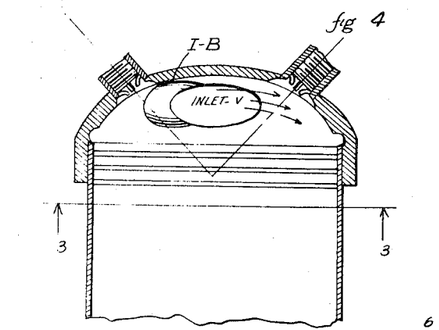
Fig. 4 shows a vertical elevation of a cylinder and cylinderhead on the section line 4—4 of Fig. 3 of the same 4 stroke cycle engine.

In Figs. 3 and 4 I have shown a valve-in-head engine, having a single inlet valve and a single exhaust valve.

The exhaust valve and inlet valve are shown flat in Fig. 3 in full outline although the two sides of the roof of the combustion chamber may be arranged at an angle, as the two sides of a roof over a house.

The sparkplug A is placed closer to the exhaust valve than to the inlet valve and the sparkplug B in reverse position. Sparkplug A fires a few degrees ahead of sparkplug B.

I further provide to the left of the inlet valve a baffle on the inner surface of the roof of the combustion chamber so that the mixture can only be thrown clockwise or with a clockwise-swirl into the cylinder. This swirl continues during the compression period, and if the sparkplug A were placed in the plane 4a—4a of Fig. 3 instead of the plane 4—4, the flame from the sparkplug A would reach the region of the exhaust valve quicker than the region around the inlet valve. However, in addition to said swirl I prefer to place the sparkplug A closer to the edge of center of the exhaust valve and ignite it in addition earlier than the sparkplug B. Therefore even if the two plugs A and B were placed in the plane 4a—4a instead of 4—4, the plug A should be fired first.

The number of degrees of crankshaft rotation A should fire first depends therefore on different conditions, and a little bit of experimentation involving little costs can easily establish the best interval between the two plugs.

I have shown further in Fig. 3 a sparplug $A^1$ also closer to the inlet valve than to the exhaust valve. If this plug $A^1$ were fired singly, or ahead of plug B, the flame would reach nevertheless the neighborhood of the exhaust valve first on account of said swirl, although neither sparkplug B or $A^1$ is closer to the exhaust valve. Therefore I do not limit myself to this position A of Fig. 3 at all, as claimed in the appended claims. In other words both positions $A^1$ and A are claimed.

Figure 5:
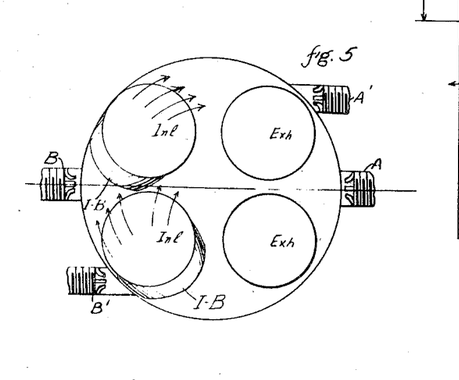
Fig. 5 shows the inside of a four stroke cycle engine, with two inlet valves and two exhaust valves, showing further the location of two sparkplugs. One set being A and B. The other set A¹ and B¹.

In Fig. 5 I have shown a similar arrangement.

Figure 6:
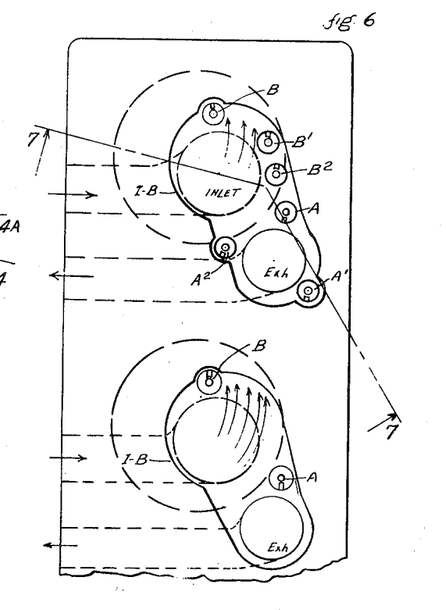
Fig. 6 shows an engine having an inlet valve over the cylinder and an exhaust valve in the cylinder in horizontal cross-section on the section 6—6 of Fig. 7.
Figure 7:
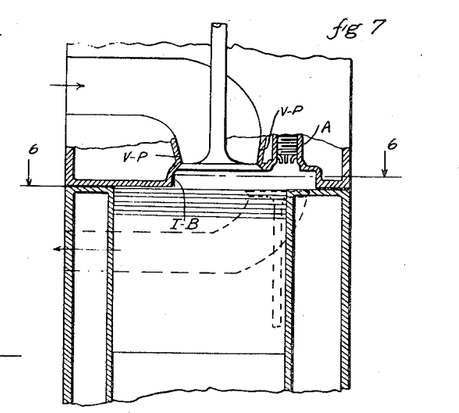
Fig. 7 shows said same engine in vertical elevation on the section line 7—7 of Fig. 6. Both showing the location of the two sparkplugs one set A and B. Another set A¹ and B¹. Another set A² and B².

The two inlet valves are or may be provided with similar baffles to cause a swirl in a clockwise direction in the combustion chamber. If the plugs are shown in the position $A^1$ and $B^1$ the swirl will carry the flame from sparkplug $A^1$ first to the exhaust valves before or substantially simultaneous with the firing of sparkplug $B^1$. In Figs. 6 and 7 I have shown an inlet valve in the cylinderhead over the cylinder bore, and an exhaust valve in the cylinder.

I have further shown only the outline of the combustion chamber lying partially over the cylinderbore as in Figs. 1 and 2.

I have shown further that the periphery of the inlet valve lies eccentrically of the wall of the combustion chamber. The mixture comes from the left and the wall of the combustion chamber itself forms a perfect baffle in order to throw the mixture in an anti-clockwise direction into the cylinder.

I may further provide just ahead of the inlet valve a slight Venturi passage, indicated by V—P in Fig. 7 to speed up the gases when passing into the inlet valve throat.

The sparkplug A I place again closer to the edge of the smaller exhaust valve than to the edge of the inlet valve, and closer to the center of the exhaust valve than to the edge of the inlet valve. The sparkplug B is placed preferably on the other side of the inlet valve taken from position of plug A.

Variations thereof in pairs are indicated by the pairs $A^1$ and $B^1$, and $A^2$ and $B^2$. But in each case the sparkplug A is closer to the edge of center of the exhaust valve and fires first.

However, I may combine plug $A^1$ with B or plug $A^2$ with B.

Figures 8, 9, 10, 11, 12, 12A, 13, 14, 15, 16:
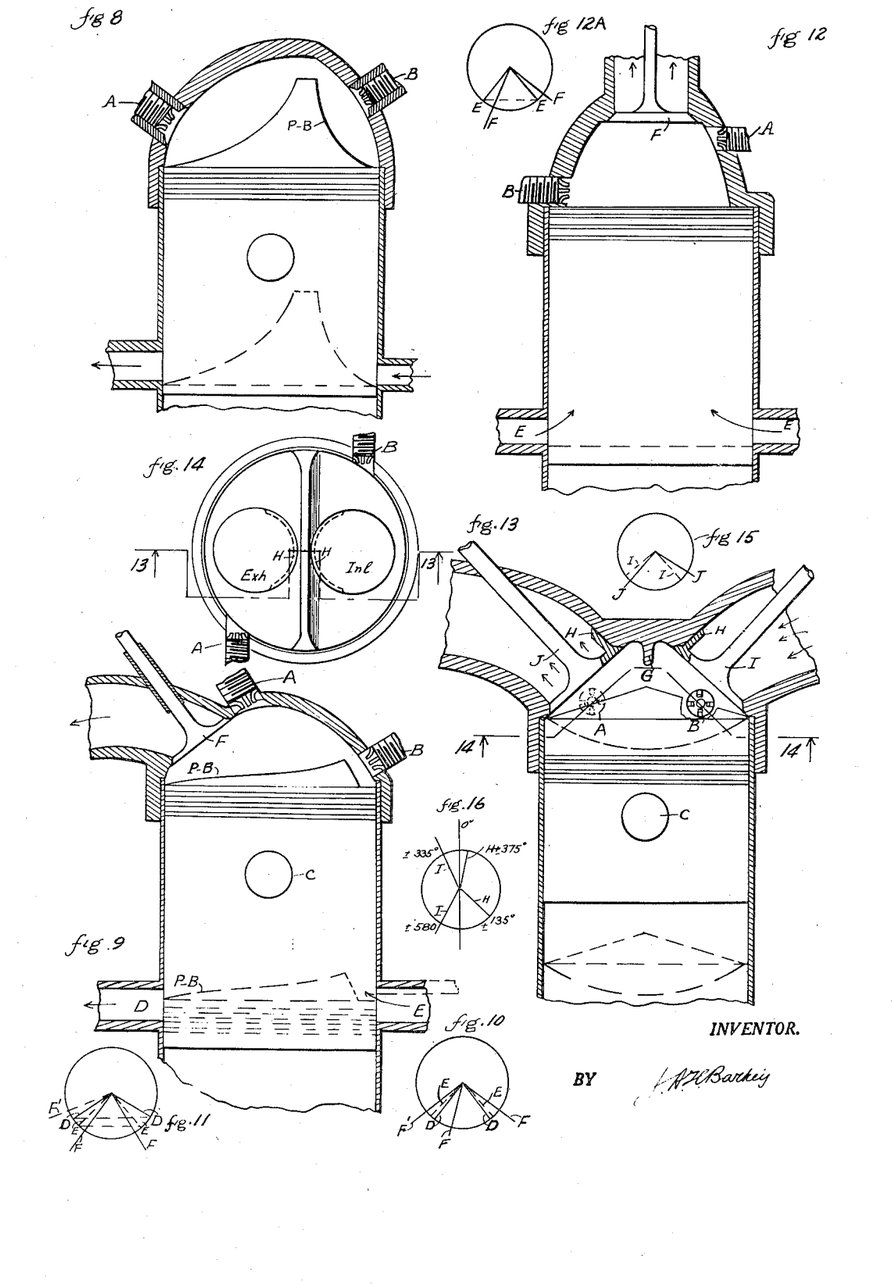

In Fig. 8 I have shown a 2 stroke cycle engine in which the exhaust ports and inlet ports in the cylinder are controlled by the piston. The left side of the piston, left of the baffle on the piston, indicated by P—B, gets considerably hotter than the right side of the piston which controls the incoming mixture. Therefore sparkplug A to the left is fired ahead of the plug B on the right.

In Fig. 9 I improve the engine of Fig. 8 considerably. I add an additional exhaust port and valve F in the cylinderhead above exhaust port in the cylinder controlled by the piston.

In accordance with the diagram of Fig. 10 I open the exhaust valve F ahead of the exhaust port D controlled by the piston. Inlet port E opens in between.

I may close F before port D is closed by piston. It may close F after port D is closed by piston.

The port E closes either before F closes, or after F closes (resp. $F^1$ and F). In accordance with diagram of Fig. 11, I open the exhaust valve F after the port D by the piston. Inlet port E opens in between.

I may close F before the port D by the piston, as shown in Fig. 11. I may close $F^1$ after port D by the piston, as shown in Fig. 11. The port E closes after one of the ports, for example F, is closed or port E closes after port F is closed, both for supercharging purposes.

The sparkplug A I place again close to the edge of the exhaust valve F, and the sparkplug B close to the coolest part of the piston.

Sparkplug A is again fired preferably ahead of plug B for the reasons explained.

Figure 13A:
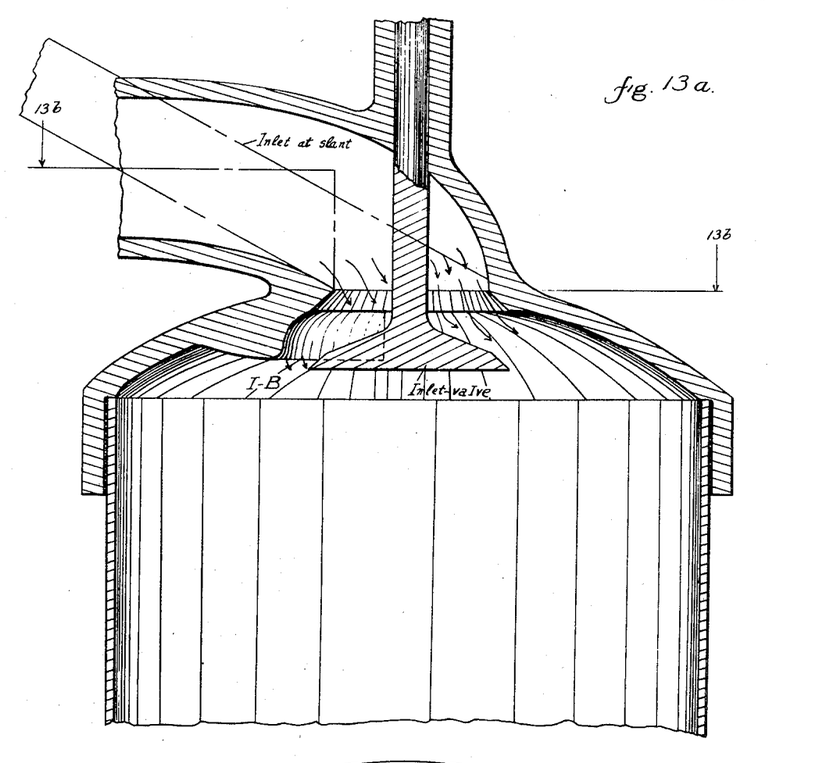
Fig. 13a shows another species in a section taken on line 13a—13a of Fig. 13b.
Figure 13B:
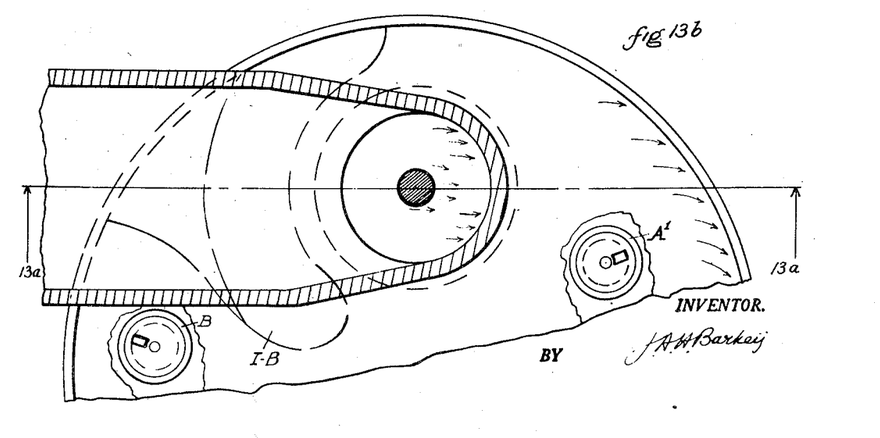

The baffles I—B of Figs. 3, 4, 5 are illustrated in the Figs. 13a and 13b.

In Figs. 13a and 13b I have shown on an enlarged scale the baffles to be constructed around the inlet valves in order to effect a swirling motion of the air or gas-charge into the cylinder. As shown already in my prior Patent No. 2,191,745 the approach of the inlet passage is made preferably over the baffle so that the gasmass is moving directly in the direction of the open side of the inlet valve where no baffle is located.

The advantage of this construction is that the direction of the swirl is towards the sparkplug $A^1$ and if this sparkplug fires first the flame will spread much faster towards the exhaust valve than towards the inlet valve so that the gasmass near the exhaust valve is burned first. A further advantage is that both sparkplugs may be placed in the cooler part of the head and stay cooler during operation, which is especially of importance for aircooled cylinders. Furthermore the front part of these cylinders is usually cooler than the back part, so that the rear plug should be in the cooler part.

The sparkplugs are shown in upright position or vertical position, but I do not limit myself to such a position at all. It is evident from the Figs. 13a and 13b that if it is preferred to place for instance sparkplug B closer to the inlet, the inlet passage would be in the way and it is in that case imperative to place the sparkplug horizontally to get at it with a wrench.

The inlet passage may be arranged at a slant as shown by two broken lines, in which case the baffle is not imperative to effect the swirl, because the gas naturally will continue in the slanted direction if not deflected. In that case the inlet valve has to be made larger because the inlet passage being more or less flat, it has to be broadened (with square or oval sides, or elliptical cross-section) and this involves a larger valve in order not to impede the flow.

As explained in said prior patent a restriction may be formed towards the seat of the valve in order to accelerate the charge at the narrowest point of its passage from inlet passage to cylinder. This acceleration is very important in case no supercharger is used. If a supercharger is used the charger can create the acceleration far better.

In Fig. 12 I have shown a 2 stroke cycle engine, the exhaust of which is controlled by one or more valves in the head and the inlet is controlled by the piston. The exhaust valve F opens in accordance with diagram 12a ahead of the inlet port E in the cylinder controlled by the piston. And port F closes preferably before E closes.

Sparkplug A is placed close to the edge of the exhaust valve or valves, and fires ahead of the plug B located near the edge of the piston.

In Fig. 13 I show a 2 stroke cycle engine in which the inlet valve and exhaust valve are both in the head. The valves are provided with baffles H adjacent to a vertical plane midway the valves through the axis of the piston pin C. Or I provide the roof of the combustion chamber with a baffle G hanging down, dividing the chamber partly in two parts. The mixture is either thrown down into the cyinder by the baffle H or baffle G. The sparkplug A is again placed closer to the exhaust valve and fires ahead of the plug B near the inlet valve. The valve-operation diagram of Fig. 15 shows that the exhaust valve preferably opens first and the inlet closes after the exhaust closes, providing the possibility to supercharge the cylinder.

However, the arrangement of Figs. 13, 14, may operate on the 4 stroke cycle as well, as shown in Fig. 16. The exhaust valve H opens about 45° before bottom position, and closes about 15° after top dead center. The inlet valve I opens about 25° to 10° before top dead center, and the inlet gases may drive out the exhaust gases by means of the baffle G hanging down from the roof or by means of the baffle H on the inlet valve, the exhaust valve remaining open substantially during top dead center position of the piston. This arrangement effects a considerably better volumetric efficiency especially at high speeds.

The piston head can be either dished or humped as shown. The purpose of the dished piston-head is to get a greater sweep-out of the burned gases by the new charge. The purpose of the humped piston is to have less sweeping out of the burned gases and less loss of the new charge through the exhaust, but a smaller compression space.

The purpose of firing with an interval is twofold. Primarily to prevent too great a rate or acceleration of pressure rise. Although I prefer the non-simultaneous firing, I do not limit myself to the same.

It is further understood that I may fire the sparkplug 14a in Figs. 1 and 2 by itself. It should be noted in particular that both sparkplugs 13a in Fig. 2A as well as 14a in Fig. 2, fall outside the area of the head and the exhaust valve when extended upwardly.

It has been proposed before by Ricardo to place a single sparkplug slightly (i. e. with a bias) closer to the edge of the exhaust valve than to the edge of the inlet valve. (See his British Patent 358,909, but he did not show any means in said patent to cause a swirl in the gas mass from the exhaust valve to the inlet valve. Nor did he show this latter feature in his Patent No. 2,076,593 of April 13, 1937, in which he places a single sparkplug closer to the exhaust valve than to the inlet valve. Nor did Baits show this latter feature in his Patent No. 1,802,495 of April 28, 1931, in which on the contrary the swirl goes directly from the inlet valve to the exhaust valve as clearly shown in Fig. 4.) Applicant proposes, however, as shown in Figs. 1 and 2 to place the sparkplugs outside the triangle, formed by the three planes c—c, d—d, e—e, going through the axis of the cylinder and the axes of the valves. The radiation of the edge of the exhaust valve, when seated, is considerably less than of the center part. Therefore the plug 13a, or 14a, should preferably not be over or near the center of the exhaust valve.

Figure 17:
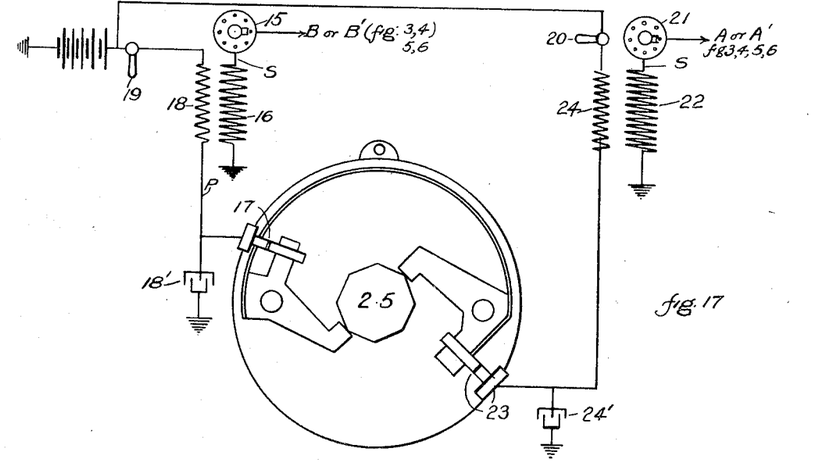
Figs. 17 and 18, 19, show diagrammatically the timing mechanism for non-simultaneous firing.
Figure 18:
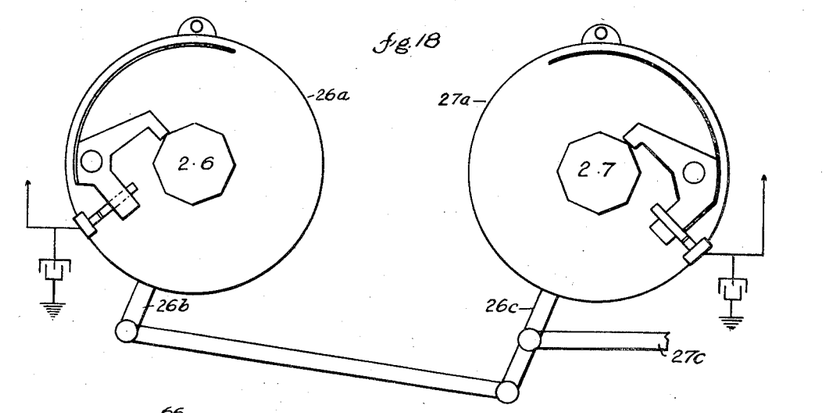

In Figs 17 and 18, I have shown diagrammatically two ignition systems to effect non-simultaneous firing or simultaneous firing.

In Fig. 17 I use a single interrupter or cam 25 and two contact breakers 17 and 23. The contact breaker 17 of the primary current 18 is connected by means of a switch 19 to a battery. The induction from the primary circuit on the secondary circuit 16 is distributed by a standard distributor 15 to either sparkplug 13 or 14 of Figs. 11 and 12 respectively, or to any of the other sparkplug of any set of two sparkplugs for a single combustion chamber.

The contact breaker 23 of the primary circuit 24 is connected by means of switch 20 to the same battery. The induction from the primary circuit 24 on the secondary circuit 22 is distributed by a standard distributor 21 to the sparkplug 13a or 14a of Figs. 11 and 12 respectively, or to any of the other sparkplug of any set of two sparkplugs for a single combustion chamber.

If the cam rotates counterclockwise, the contact breaker 23 operates ahead of the contact breaker 17.

The primary circuits are grounded by means of intermediate condensers $18^1$ and 24 respectively to decrease arcing at the breaker points, as is standard construction.

The interval between the two plugs is fixed by the setting of the contact breakers. The arm 27c connected to the breaker plate 25a, may be operated by the vacuum piston 66 of Fig. 19 in any well known way in the art to vary the timing. Usually the timing of the sparks is automatically regulated not only by vacuum but also by centrifugal weights, as is well known in the art. (See for instance ignition system of U. S. Patent No. 1,801,600 of April 21, 1931, to J. T. Fitzsimmons.)

In Fig. 28, I use two cams 26 and 27, on two interruptors, which are both geared to the crankshaft in two to one ratio for the 4-stroke cycle and in direct ratio for the two stroke cycle. The cams 26 and 27 may be arranged on the same axis horizontally as is well known in the art. The primary and secondary circuits are, of course, arranged as shown in Fig. 17.

In order to vary the interval between the two sparkplugs in the combustion chamber, I connect each contact-breaker plate with arms of different length, moved by the same arm 27c which may be moved by vacuum power. Likewise here the cams 26—27 may be varied in their position relative to the crankshaft by means of centrifugal weights as is well known in the art. (See for instance ignition system of Patent No. 1,801,600 of April 21, 1931, to J. T. Fitzsimmons, Fig. 1, 23, 162 to 177.) (For simultaneous firing.) (See Fig. 12.)

Figure 19:
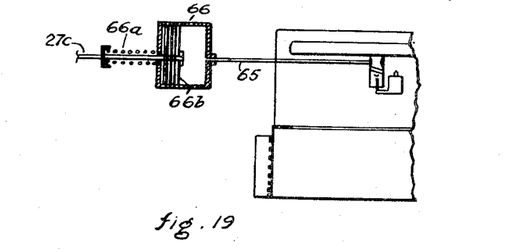

In Fig. 19 I have shown diagrammatically that with increase of vacuum in the inlet manifold of an internal combustion engine, the piston 66b in the cylinder 66 may act against the tension of a spring 66a. When the vacuum increases the ignition is advanced. If the vacuum decreases the spring 66a decreases the advance.

However, as is well known in the art such a system is usually combined with means to vary the timing in addition with means, usually centrifugal weight-means, depending upon the speed of the engine. These centrifugal means vary the positions of the cams 25, 26, 27 with respect to the crankshaft. It is obvious that on account of the different length in the arms 26b and 26c connected to the contact-breaker plates, the interval of timing between the two sparks in a single chamber may be varied in addition to its variation in the cycle of the engine, or in other words with respect to the timing of the exhaust and inlet valves of the engine.

The arms are only made of different length, if it is desirable for any given engine to vary both the interval and the timing. It is obvious in Fig. 18, that if the arm 27c is moved a given distance, that the distributor 26a, carrying the smaller arm, will be moved over a greater distance, in this case a greater arc of motion, than the distributor 27a, carrying the longer arm. Therefore the ignition of the plugs belonging to distributor 26a will be advanced or retarded a greater number of degrees of crankshaft rotation than the plugs belonging to the distributor 27a. The result will be that the timing of the two distributors will be advanced or retarded in unequal degrees, and the interval between the two plugs of each cylinder is variable and varied while advancing or retarding the ignition of both plugs of each cylinder by the vacuum device shown in Fig. 19.

If the distributor 26a serves the first firing plug in each cylinder and 27a the second firing plug, the interval becomes smaller by the advance and greater by the retardation.

If, however, the distributor 26b serves the second firing plug in each cylinder and 27a the first firing plug, the effect will be, of course, the exact reverse, the interval becomes smaller when advancing the ignition timing and greater when retarding it.

In general it can be said that in fast rotating motors, the interval should become greater at greater speeds even in view of the fact that the actual time for the flame to burn the entire charge is getting smaller and smaller. However, the speed of the flame at greater engine speeds, greater compression, greater turbulence is getting faster and faster. In fact if the swirl effected by the deflecting wall around the inlet valve is very great and continues into the latter part of the compression period when ignition takes place, it has been found by us that the flame swirls with the gas mass and displaces itself with the rotating gas mass rather than progressing faster with the swirl than against the swirl. This phenomenon therefore assists the position of the plugs as stated in the appended claims to burn the last portion of the charge liable to detonate in the cooler portion of the chamber where the sparkplug is located. In so far as the air-fuel ratio determines the speed of the flame more than any other factor, this applicant does not limit itself to either the one or the other construction.

In certain engines operating with the greatest possible economy, like airplane engines at cruising speed, the one system may be preferable, and in other engines where a maximum power is desired at given speeds the other system may be preferable.

Some engines operate near sea-level and the apparatus of Fig. 19 operates in an entirely different way, than in engines operating at 15,000 to 50,000 feet altitude. At higher altitude, the overlapping of the open position of the inlet and exhaust valve has further an effect entirely different from that at lower levels. In general it can be said that the amount of the new charge lost towards the exhaust valve increases at higher levels so that the deflecting wall deflecting the charge away from the exhaust valve becomes of greater and greater importance.

Therefore this applicant does not limit himself to either way.

It is further obvious that if the two arms are of equal length and the two distributors are so timed that there is a firing interval between the plugs of each cylinder, that the interval between these plugs remains the same whether the timing of both is advanced or retarded.

It is further obvious that if the arms are of equal length, and the two distributors are so timed that there is no firing interval between the plugs of each cylinder, i. e. dead-simultaneous firing, that the plugs of each cylinder will continue to fire dead simultaneously whether the ignition is advanced or retarded.

It is further noted, that the ignition keys 19 and 20 shown in Fig. 17, allow the operator to cut out either the ignition of the plug closer to the exhaust valve than to the inlet valve, or that of the plug closer to the inlet valve than to the exhaust valve, at any time and under any condition or circumstance.

It should further be noted that the deflecting means inside the chamber deflecting the incoming charge from the inlet valve away from the exhaust valve is closely related to the overlapping feature disclosed in the various timing diagrams of the exhaust and inlet valves, and the scavenging and exhaust periods, allowing simultaneously therewith a supercharging either in the 2 or 4-stroke cycle types.

Therefore the direction of deflection from the inlet valve is not only related to direct the charge to either one or both of the plugs shown, but to deflect the charge so that it sweeps out the remaining charge in the compression space of the cylinder towards the exhaust valve during the end of the exhaust period. Therefore this deflecting effect is or may have a double purpose, closely related to each other and to the volumetric efficiency of the engine. If the charge is an air charge, this scavenging effect necessarily can be carried to its extreme effect, scavenging all of the remaining gases from the combustion chamber by means of said deflecting effect, because a certain percentage of loss of the new air charge is not serious because no fuel is thereby lost.

Likewise the Venturi passage shown in Fig. 13b, which forms a part of Fig. 3, accelerates the air- or mixture-charge through the inlet valve so much that it affects the volumetric efficiency of the engine so much, that also this feature is also closely related to the deflecting means and the overlapping feature of the inlet and exhaust valves. The greater the speed of the incoming charge is the greater the deflecting effect of the deflecting means inside the chamber must be, in order to prevent too great a loss of the new incoming charge. Likewise the greater the incoming speed of the charge is, the more the flame in its development or rather during its development will be carried and displaced by this swirl. Therefore the position of the plugs relative to the valves, the position of the deflecting means, the Venturi passage leading up to the seat of the inlet valve, and the overlapping number of degrees of engine-crankshaft rotation, are all factors closely related to each other in the engines as claimed in the appended claims.

It further should be noted that if the appended claims have as an element, that the electrodes are inside the periphery of the combustion chamber, that said element means that the relative sparkplug may either extend its electrodes into the main chamber, or extend inside an auxiliary chamber, or pocket, or bay, communicating with the main chamber, or are located exactly where the main chamber, and the pocket or ignition bay, meets or goes over into the chamber as shown in various figures.

The means to effect this substantially simultaneous firing has been explained in my prior Patent No. 2,173,081, on page 6, last 8 lines and first 14 lines in column 1, page 7, in which the firing to be effected by the means shown in Figs. 1 and 1A, is called substantially simultaneous firing.

As described above, said means, here repeated in Figs. 17, 18, 19 can effect simultaneous firing and non-simultaneous firing in different engines, but may also, of course, effect simultaneous and non-simultaneous firing in the same engine. The breakers for the primary current may be so set that at a minimum of vacuum in motor 66 of Fig. 19, the firing is simultaneous and at a maximum of vacuum, on account of the different length of the arms 26b and 26c, the firing becomes non-simultaneous, staggered or unsimultaneous, and such firing could not possibly be called entirely simultaneous or entirely unsimultaneous.

Furthermore when the firing interval is 6° of crankshaft rotation, and the engine is rotating at a speed of about 3000 R. P. M., the actual time interval is only 33 hundred-thousandths of a second, or about one three-thousandths of a second. It stands to reason that such a short time interval can only be called substantially simultaneously, but never simultaneously, because it is so small that one can assume readily that the firing is "almost" simultaneously. "Substantially" simultaneous firing can only means "almost" simultaneous firing.

In the present patent, the patentee adheres to this same basic method of arranging the plugs and the sequence of firing, but thereto is added or are added deflecting means located over the cylinderbore in order to deflect the charge with a swirl around the axis of the cylinderbore. This deflection and swirl will assist the location of the sparkplug in effecting the said method of firing in which the charge closer to the exhaust valve is burned before that part of the charge located closer the inlet valve. In effect, if this swirl is increased and intensified by supercharging means, and by walls placed effectively so that the incoming charge is deflected around the axis of the cylinderbore, it will continue into the end of the compression period and displace the flame in this rotating mass or charge when it is burning either in one place or in two places. These deflecting means, however, have as another purpose, closely related to the former, to clean either sparkplug from old gases, especially if they are placed more or less in auxiliary chambers, as stated before. In Fig. 3 it is therefore shown, that the sparkplug A does not have to be necessarily closer to the exhaust valve than to the inlet valve, for the simple reason that the swirl will displace the flame towards the region of the exhaust valve. The earlier firing of this plug A¹ as shown in Fig. 3 assisted by the swirl will bring this effect about, so that it is evident that both sprakplugs A¹ and B may be placed closer to the inlet valve, where they will stay cooler and function considerably better than when they are too hot. Therefore the appended claims are not limited to the position of the plugs A and B, but their position is only limited to one on opposite sides of a plane through the axes of the valves. It stands to reason that if either position A¹ or A is satisfactory if a substantial swirl around the axis of the cylinderbore is effected, that any position in between can be applied, which naturally includes the old standard equidistant position discussed before.

Likewise, as stated before for the L-head construction, the depression or projection 6 may have different shapes, because I stated that the passage 9—9a may be appreciably decreased, and the passage 8—8a, opposite the inlet valve 10, appreciably increased, the position of the plugs 13 and 13a corresponding with the position of the plugs A¹ and A of Fig. 3, of course, both being located on same side of the valves (that means not plugs A and B, because plug B in Fig. 3 never fires first, because the swirl would carry the flame away from the exhaust valve). It stands to reason that the plugs 13 and 13a are not strictly limited to their position shown, but may be varied in position in accordance with the deflection caused by the deflecting wall 7a and the deflection caused by the wall or projection or depression 6, but one has to be placed closer to the exhaust valve than to the inlet valve as stated in said Patents 2,145,577 and 2,191,746. The patentee, like anybody else, may exchange the positions of the inlet valve 10 and exhaust valve 11, so that the deflecting wall 6, as stated hereinbefore, causes a swirl of the mixture in the cylinder, and the direction and intensity of this swirl depends upon the extent and shape of the projection 6, varying in accordance to the position of the valves 10 and 11 in shape and length. This swirl affects likewise here the flame, after it has been initiated at one particular point or at two particular points. If the plug 13 is used closer to the inlet valve and valve 10, being opposite 8—8a, the flame will spread depending upon its position closer to the inlet valve. If the inlet valve 10 is placed opposite the decreased passage 9—9a, it still must be placed closer to the inlet valve, and the flame will spread in accordance with its position, which should preferably be slightly moved closer to the plane midway the two valves 10 and 11, through the axis of the cylinderbore (plane b—b), in order to be closer to both valves if only a single plug 13 is used. If a single plug 13a is used, this plug should be moved likewise slightly towards the said plane midway the valves and through the axis of the cylinder, because the incoming charge deflected from the inlet valve and wall 7a, between the two valves, will also clean the electrodes of the plug in the latter position. Only when both plugs 13 and 13a are used simultaneously in one chamber, can they be placed exactly as shown, the one near the exhaust valve firing first (that means outside the planes through the axes of the cylinderbore and the two valves). Either sparkplug 13, or 13a, used singly or in combination, is so placed that its axis is located adjacent that side of the valves which is adjacent the cylinderbore but not on that side of the valves remote from the cylinderbore as shown and claimed in the Patent No. 1,722,404 of July 30, 1929, to Whatmough, and in Patent No. 1,887,897 of November 13, 1932, to W. A. Whatmough, or placed right over the exhaust valve as shown in Patent No. 1,817,208 of August 4, 1931, to E. Rector. Although, the swirl in the L-head construction on account of the restricted passage between the piston chamber and the combustion chamber proper, created by said projection or depression 6, is not nearly so effective as in the valve-in-head structure of Fig. 3, it nevertheless affects greatly the deflection of the charge towards one side of the cylinder bore and towards the sparkplugs 13 or 13a, placed closer to the plane midway the valves and through the axis of the cylinderbore, on account of its proximity to said depression or projection 6.

Finally the location of valves of Figs. 1, 2, 2a, are defined as follows with respect to the crankshaft and its axis.

The cylinder and cylinderbore is used in an opposed cylinder type engine in which the valves are placed in horizontal planes, one above the other so that when a plane is drawn horizontally through the crankshaft axis and going through the approximate center of the cylinderbore and combustion chamber, the inlet valve is on one side of said plane and the exhaust valve on the other side of said plane, so that the sparkplugs 13 and 14 are on one side of said plane, and the sparkplugs 13a and 14a are on the opposite side thereof. Another plane perpendicular to said first plane and through the center of the chamber would bring an inlet and exhaust valve at one side thereof.

The location of the axis of the crankshaft in Fig. 3 is similar. A plane through the axis of the crankshaft will bring the inlet valve on one side of said plane and the exhaust valve on the other side, together with the sparkplugs A and $A^1$, or sparkplug B, respectively. Another plane at 90° to said first plane would bring half of each valve on each side of said second plane, said plane going also through the center of said chamber, and at 90° to said crankshaft.

The location of the axis of the crankshaft in Figs. 5, 6, 7, is similar. A plane through the axis of the crankshaft will bring the two inlet valves and its sparkplugs on one side of said plane, and will bring the exhaust valves and its sparkplugs on the other side of said plane. Another plane through the axis of said chamber and at 90° angle to said first plane and at 90° to said crankshaft axis would contain one inlet valve and one exhaust valve on each side of said second plane.

It is further understood that I may combine sparkplug 13a with sparkplug 14 so that the two sparkplugs would be on opposite sides of a plane through the axes of the two valves. Or likewise I may combine sparkplug 13 with 14a, so that in that case also the two sparkplugs would be on opposite sides of a plane through the axes of the valves. One sparkplug would be equally closer to the exhaust valve and the other sparkplug equally closer to the inlet valve.

In Figs. 3 and 4 the two sparkplugs are also on opposite sides of a plane through the axes of the two valves.

In Figs. 5 and 6 the two sparkplugs are also on opposite sides of a plane through one inlet valve and one exhaust valve, taking non-opposite inlet and exhaust valves.

In each application the approach and location of the inlet manifold with respect to the inlet valve is of prime importance to create an uni-directional swirl in the chamber which carries the gas or air-mixture charge substantially around the axis of the chamber and cylinderbore, which swirl further carries the flame-propagation of the first or initial ignition towards the exhaust or the nearest exhaust-valve if two, not more, are applied as shown in Figs. 5 and 6.

It is further obvious that in Figs. 1, 2, 2a, the sparkplugs 13 and 13a are located substantially in a plane at 90° to a plane separating the inlet and exhaust valve, said latter plane being parallel to the crankshaft axis, or through the crankshaft-axis as explained. It is further obvious in Figs. 3 and 4, that the sparkplugs A and $A^1$ are both on the same side of a plane through the axes of the valves but on opposite sides of a plane midway the said two valves. It is understood that the first sparkplug firing first, may be placed at all intermediate points between A and $A^1$, provided this sparkplug is fired first. The second sparkplug B, however, must be placed closer to the inlet valve than to the exhaust valve and never closer to the exhaust valve than the inlet valve. In other words even if the sparkplug $A^1$ were placed equidistant from the edge of the exhaust valve and inlet valve, provided the swirl is undirectional from said latter position towards the exhaust valve and of sufficient strength to carry the flame more towards the exhaust valve than to the inlet valve, such a position would be new in the art provided that sparkplug $A^1$ were fired substantially ahead of the other sparkplug.

It is equally understood that the swirl increases in speed when supercharging means are applied, and the position of sparkplug $A^1$ may vary from an equidistant position to the valves to a position shown at $A^1$ in which the first firing sparkplug is closer to the inlet valve.

It is further obvious that the ignition means of Figs. 17, 18, 19 can be timed to fire the two sparkplugs simultaneously and vary their timing.

I claim:

1. In an internal combustion engine of the 4 stroke cycle type, a cylinder with a cylinderbore, a piston reciprocating therein, a cylinderhead closing said cylinderbore, a combustion chamber in said cylinder head, a single inlet valve and a single exhaust valve opening in said combustion chamber limiting the valves to two valves, and a deflecting wall around said inlet valve and inside said chamber deflecting the charge towards a single sparkplug closer to the edge of the head of said exhaust valve than to the edge of said inlet valve and another single sparkplug closer to the edge of said inlet valve than to the edge of the exhaust valve, said two sparkplugs located in opposite sides of said chamber, and extending with their electrodes into said chamber and inside the periphery of said chamber, said sparkplugs firing with an interval so that said first sparkplug fires from 2° to 12° crankshaft rotation ahead of said second sparkplugs, in combination with means to vary the timing of said interval during said cycle.

2. In an internal combustion engine of the 4 stroke cycle type, a cylinder with a cylinderbore, a piston reciprocating therein, a cylinderhead closing said cylinderbore, a combustion chamber in said head containing a single inlet and a single exhaust-valve in said chamber, a deflecting wall inside said chamber deflecting the charge to either one of the following two sparkplugs, two sparkplugs in said chamber one of which is closer to the edge of the exhaust valve than to the edge of the inlet valve, said former sparkplug firing ahead of said latter sparkplug, with an interval of 2° to 12° crankshaft rotation, in combination with means to vary the timing of said interval in said cycle, said two sparkplugs located substantially at opposite sides of said chamber and both removed and remote from the respective centers of said valves, and at the periphery of said combustion chamber, so that the electrodes of the sparkplugs are located inside the periphery of said combustion chamber.

3. In an internal combustion engine of the four stroke cycle, a cylinder with a cylinderbore, a piston reciprocating therein, a cylinderhead closing said cylinderbore, a combustion chamber in said head containing a single inlet and a single exhaust valve, a deflecting wall inside said chamber deflecting the charge to either one of the following sparkplugs, two sparkplugs in said chamber, one of said sparkplugs being located closer to the edge of the exhaust valve than to the edge of the inlet valve but both substantially remote from the position near the center of said valves, so that the electrodes are removed from an area extended from the heads of said valves in the direction of the axes of said valves, and means to fire said first sparkplug ahead of the other, and means to vary said firing interval during the cycle of said engine.

4. In an internal combustion engine, of the valve-in-head type, of the four-stroke cycle type, comprising a cylinder, a cylinderhead, a single inlet and a single exhaust valve in said head, limiting the valves to two, and a deflecting wall inside said chamber deflecting the charge to either one of the following sparkplugs, a single sparkplug closer to the edge of said exhaust valve than to the edge of said inlet valve but substantially remote from the center of said exhaust valve, another single sparkplug closer to the edge of said inlet valve than to the edge of said exhaust valve but substantially remote from the center of said inlet valve, said sparkplugs further located at opposite sides of a plane through the axes of said two valves means to fire said first sparkplug ahead of said second plug with an interval of 2° to 12° crankshaft rotation, and means to vary said firing interval during the cycle of said engine. said sparkplugs further located in the periphery of said chamber.

5. In an internal combustion engine of the type having one inlet valve and one exhaust valve in the combustion chamber of said engine in a cylinderhead closing a cylinder, limiting the valves to two, deflecting means inside said chamber deflecting the charge towards either one of the two following sparkplugs and away from the exhaust valve, said inlet and exhaust valves being open simultaneously during the latter part of the exhaust period, a single sparkplug remote from the center of the exhaust valve being closer to the edge thereof than to the edge of the inlet valve, another single sparkplug remote from the center of the inlet valve and closer to the edge thereof than to the edge of the exhaust valve, said sparkplugs however located on opposite sides of a plane through the axes of said inlet and exhaust valve, means to fire said first sparkplug ahead of the other sparkplug and means to vary said firing interval in the cycle, both sparkplugs located on the rim of said chamber.

6. In an internal combustion engine of the four-stroke cycled type, a cylinder, with a cylinderbore, a piston reciprocating therein, a cylinderhead closing said cylinderbore a combustion chamber in said head, a single inlet and an exhaust valve in said head, limiting the valves to two, deflecting means in said chamber deflecting the charge towards either one of the two following plugs, and deflecting simultaneously therewith the incoming charge from the inlet valve away from the exhaust valve, said valves being open simultaneously during the end of the exhaust period, for scavenging purposes, a single sparkplug closer to the edge of said head of said exhaust valve than to the edge of said inlet valve and another sparkplug closer to the edge of said inlet valve than to the edge of the exhaust valve, both of said sparkplugs being remote from the center of said valves but extending with its electrodes inside the periphery of said chamber, means to introduce the aircharge into said cylinder with a swirl which carries said incoming charge through the chamber, and means to fire said first sparkplug ahead of the other sparkplug, and means to advance and retard said firing interval.

7. In an internal combustion engine of the fuel injection type, having its fuel injected during the compression period in a chamber in a head closing a cylinder of said engine, two valves in said chamber, an exhaust valve and an inlet valve, a deflecting wall inside said chamber deflecting the new charge from the inlet valve away from the exhaust valve, said valves being open simultaneously during the inlet and exhaust period, a single sparkplug in the neighborhood to the edge of said exhaust valve but remote from the center thereof, and another sparkplug located remote from the edge of said exhaust valve, but the electrodes of said sparkplugs extending into said combustion chamber inside the periphery thereof, means to cause the incoming air to enter with a swirl in said chamber, said swirl carrying the fuel through the said chamber, and carrying the fuel from the point of injection towards said first sparkplug, means to fire said first sparkplug approximately 5° to 6° ahead of said second sparkplug, and means to vary the timing of said firing interval during the cycle of said engine.

8. In an internal combustion engine of the 4-stroke cycle type, a cylinder with a cylinderbore, a piston reciprocating therein, a cylinderhead closing said cylinderbore, a combustion chamber in said head, inlet valve means and exhaust valve means in said chamber limiting the valves to two, and deflecting means inside said chamber to deflect the new charges from the inlet valve means away from the exhaust valve means, said inlet and exhaust valve means being open simultaneously during the end of the compression period and the beginning of the inlet period, said inlet valve means located at one side of a plane through said chamber and parallel to the axis of the crankshaft of said engine which is the longitudinal axis of said engine, a single sparkplug located closer to said exhaust valve means than said inlet valve means on one side of said plane, and a single sparkplug located closer to said inlet valve means on the other side of said plane, and means to fire said first sparkplug between 2° and 12° crankshaft rotation ahead of the said second sparkplug, and both of said sparkplugs being remote from the center of said valves, and also remote from the periphery of said chamber so that the electrodes of the sparkplugs extend inside the periphery of said chamber.

9. In an internal combustion engine of the 4 stroke cycle type, a cylinder with a cylinderbore, a piston reciprocating therein, a cylinderhead closing said cylinderbore, a combustion chamber in said head, inlet-valve means and exhaust valve-means in said chamber, limiting the valves to two, and deflecting means inside said chamber deflecting the new charge from the inlet valve away from the exhaust valve, said latter valves being open simultaneously during the latter part of the exhaust period when the piston approaches top dead center position, a plane midway said two valves through the axis of said cylinder separating said inlet-valve means from the exhaust-valve means, said plane being parallel to the longitudinal axis of said engine, a single sparkplug located close to said exhaust valve means but remote from the center thereof and on one side of said plane, another single sparkplug located close to said inlet valve means but remote from the center thereof, and means to fire said first sparkplug at least 3 degrees ahead of said other sparkplug said two sparkplugs being remote from the center of said valves and remote from the periphery of said chamber so that the electrodes extend inside the periphery of the combustion chamber.

10. In an internal combustion engine of the 4 stroke cycle type, a cylinder and a cylinderhead, a combustion chamber in said head, inlet and exhaust valve means in said chamber, limiting the valves to two, and deflecting means inside said chamber to deflect the incoming charge from the inlet valve away from the exhaust valve, said latter valve being in overlapping open position during the latter part of the exhaust period, a plane through the axis of the crankshaft of said engine, said plane separating the inlet valve means from the exhaust valve means, a single sparkplug located close to said exhaust valve means but remote from the center thereof, another single sparkplug located close to said inlet valve means but remote from the center thereof, a plane through the axis of said cylinder separating the inlet-valve means from the exhaust valve means, said sparkplugs being located on opposite sides of said latter plane and located both remote from the periphery of said chamber so that the electrodes extend inside the periphery of said chamber, and means to fire said first sparkplug at least 5° of crankshaft rotation ahead of the said second sparkplug.

11. The combination of cl. 10 in combination with means to vary the firing interval in the cycle of said engine without varying the length of the interval itself, said means comprising the standard primary and secondary circuits, said primary circuits being interrupted respectively by two interruptors operated by the same cam.

12. The combination of cl. 10 in combination with means to vary the length of the interval in the cycle and the timing of the interval in the cycle, said means comprising the standard primary and secondary circuits, said primary circuits being interrupted respectively by two interruptors operated by the same cam.

13. In an internal combustion engine of the L-head type, a cylinder, a cylinderhead, a piston reciprocating in said cylinder, inlet and exhaust valve means in said cylinder, said cylinderhead having a combustion chamber substantially overlying said inlet and exhaust valve means, said combustion chamber having adjoining passages, substantially parallel, adjacent, and communicating restrictedly with the end of said cylinder, the end of said cylinder being otherwise permanently closed, two spark ignition means including one sparkplug located substantially closer to the edge of the exhaust valve than to the edge of the inlet valve in said combustion chamber, both of said sparkplugs being further so located that the electrodes of the sparkplugs fall substantially outside the area of the heads of said valves if extended in the direction of the axes of said valves and a deflecting wall inside said chamber to deflect the incoming charge not to said first sparkplug but to the other sparkplug, said mentioned sparkplug firing substantially ahead of the other sparkplug, which is closer to the edge of the inlet valve than to the edge of the exhaust valve.

14. In an internal combustion engine of the explosive type, a cylinder, a piston reciprocating therein, a cylinder having a combustion chamber, inlet and exhaust valve means side by side in upright position in said chamber, said valve means including valve stems arranged substantially parallel to the axis of said cylinder, and two spark ignition means of which one is located substantially closer to said exhaust valve than to said inlet valve, both of said sparkplugs further so located that the electrodes thereof are substantially removed from an area in said chamber described by an extension of the area of the heads of said valve if extended in the direction of the axes of said valves and deflecting means inside said chamber to deflect the incoming charge not to said first sparkplug but to the second sparkplug, said spark ignition means firing with a small interval.

15. In an internal combustion engine, a cylinder, a reciprocating piston therein, a cylinderhead, an exhaust valve and an inlet valve aligned side by side longitudinally of said engine, said head having a depending projection above said cylinder and extending over the center thereof, said projection having a convex portion facing to that portion of said chamber where said valves are located, the wall of said chamber facing said convex portion of the projection, being also convex so that the inlet charge from the inlet valve is directed towards the electrodes of one of two sparkplugs in said chamber located closer to said inlet valve than to said exhaust valve, both sparkplugs being located outside an area projected upwardly from the head of said valves in the direction of the axes of said valves and a deflecting wall inside said chamber to deflect the incoming charge to one side of said projection, the latter one of said two sparkplugs located closer to said inlet valve than said exhaust valve firing later than the other sparkplug located closer to the edge of said exhaust valve than to the edge of said inlet valve.

16. In an internal combustion engine of the 4 stroke cycle type, a cylinder with a cylinderbore, a piston reciprocating therein, a cylinderhead closing said cylinderbore, a combustion chamber in said cylinderhead, a single inlet and a single exhaust valve in said chamber, limiting said valves to two, a deflecting wall inside said chamber located above said cylinderbore to deflect the incoming charge from the inlet valve away from the exhaust valve and towards one side of said cylinderbore, and towards a sparkplug located closer to the edge of the inlet valve than to the edge of said exhaust valve, and another sparkplug located also closer to said inlet valve than to said exhaust valve, but on the other side of a plane through the axes of said two valves, in combination with means to fire said first sparkplug before the second sparkplug which usually is called staggered or non-simultaneous firing.

17. In an internal combustion engine of the 4 stroke cycle type, a cylinder with a cylinderbore, a piston reciprocating therein, a cylinderhead closing said cylinderbore, a combustion chamber in said cylinderhead, a single inlet valve and a single exhaust valve in said chamber limiting said valves to two, a deflecting wall inside said chamber and over said cylinderbore to deflect the incoming charge from the inlet valve away from the exhaust valve and towards one side of said cylinderbore, effecting a swirl therein around the axis of said bore and towards a sparkplug located on one side of a plane through the axes of said valves, and another sparkplug located on the other side of said plane through the axes of said valves but located closer to the inlet valve, in combination with means to fire said first sparkplug before the said second sparkplug, which usually is called staggered, or non- or un-simultaneous firing.

18. The combination of claim 16, in which said sparkplugs are placed in an additional chamber located in the roof of said chamber.

19. The combination of claim 17, in which said sparkplugs are placed in an additional chamber.

JEAN A. H. BARKEIJ.

REFERENCES CITED

The following references are of record in the file of this patent:

UNITED STATES PATENTS

| Number | Name | Date |
|---|---|---|
| 1,580,353 | Vincent | Apr. 13, 1926 |
| 1,847,612 | Horning | Mar. 1, 1932 |
| 2,041,073 | LaBrie | May 19, 1936 |
| 2,145,577 | Barkeij | Jan. 31, 1939 |
| 2,173,081 | Barkeij | Sept. 12, 1939 |
| 2,191,746 | Barkeij | Feb. 27, 1940 |

OTHER REFERENCES

"Dyke's Automobile and Gasoline Engine Encyclopedia," by A. L. Dyke, 13th edition, 1922, The Goodheart-Willcox Publishing Co., Inc., Chicago, pp. 216 and 217.

"Wright J. Series Aviation Engines," published by Wright Aeronautical Corp., Paterson, N. J., 1924.

"Allison Operation and Maintenance Handbook," published by General Motors Corp., in 1940, p. 22 and chart #2.

"Air Publication 1416," vol. 1, 1st edition, December 1931, Kestrel Aero-Engines, Air Ministry, February 1932, London (frontispiece, p. XIV, chapter IX, pp. 72, 73, and 74, Figs. 51, 52, 95 and 97).

Engine Handbook for Menasco "Buccaneer," Model B6S, Aircraft Engine, Menasco Manufacturing Company, 6714 McKinley Ave., Los Angeles, California. (Copy available in Division 28.)

"Air Publication 1162," 1st edition, May 1925, Jupiter, Series IV, Aero Engine, Air Ministry, published November 1925, London (frontispiece, p. 6, p. 50, Fig. 46, pp. 64 to 67, inclusive, Figs. 49 and 50). (A copy is available in Division 28).